Dec. 5, 1939.  H. VAN KEUREN ET AL  2,182,268
CONTROL VALVE FOR WATER SYSTEMS
Filed Sept. 8, 1938

H. Van Keuren
A. C. Wilkins INVENTORS

BY C. A. Snowles.

ATTORNEYS.

Patented Dec. 5, 1939

2,182,268

UNITED STATES PATENT OFFICE 2,182,268

CONTROL VALVE FOR WATER SYSTEMS

Herbert Van Keuren and Archibald C. Wilkins, Kingstree, S. C., assignors to The Safety Valve Corporation, Kingstree, S. C.

Application September 8, 1938, Serial No. 228,988

4 Claims. (Cl. 123—178)

This invention relates to an electrical device with control valve for water systems and cooling systems on internal combustion engines for the purpose of keeping the cooling liquid at a predetermined temperature at all times, and at the same time provides an automatic drain for liquid if the temperature should ever reach a dangerously low degree.

An important object of the invention is to provide an electrically controlled heating device to be positioned in the cooling liquid of the system for maintaining the liquid at a predetermined temperature, means being provided for discharging the cooling liquid and clearing the system of the cooling liquid when the temperature reaches a dangerously low degree to damage or impair the efficiency of the engine.

Another object of the invention is the provision of means for holding the emergency valve of the device closed, whereby the cooling liquid may circulate through the engine block until the temperature of the cooling liquid reaches a degree to actuate a thermostat forming a part of the system, to hold the valve normally closed.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
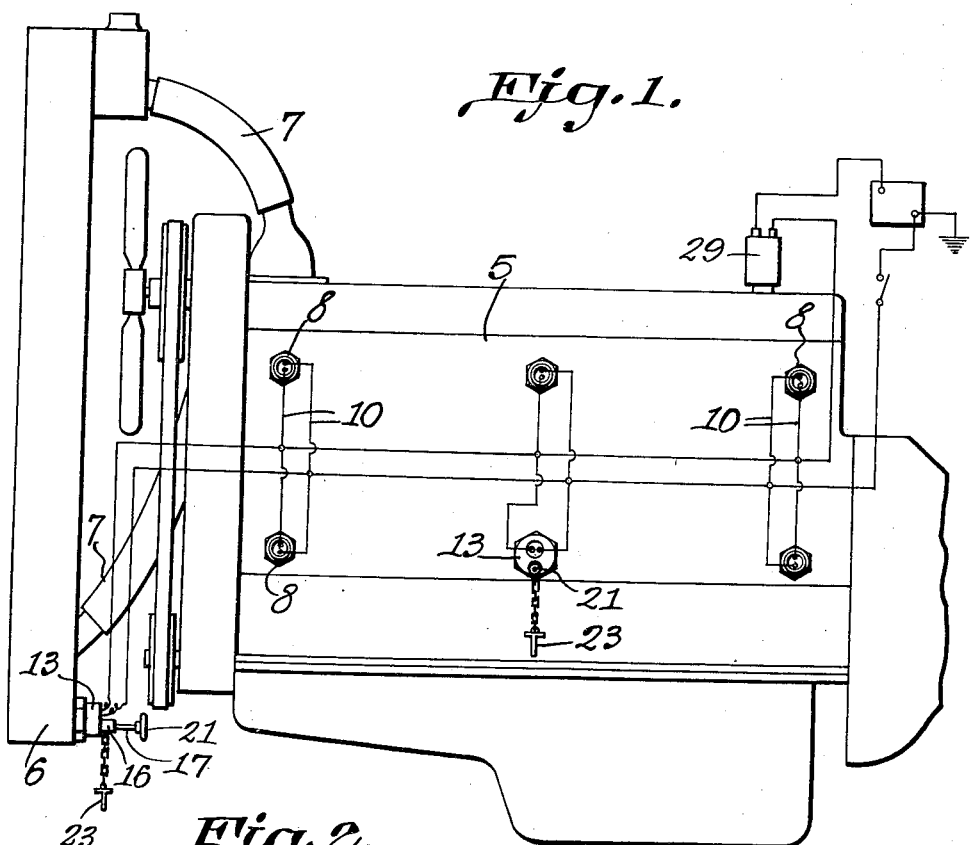
Figure 1 is an elevational view of an internal combustion engine illustrating a device constructed in accordance with the invention as applied.

Referring to the drawing in detail, the reference character 5 designates the block of an internal combustion engine, and the reference character 6 designates the radiator of the cooling system of the internal combustion engine, the radiator being connected with the engine block, through the usual pipes 7, through which the water circulates between the engine block and radiator.

As shown, the engine block is provided with threaded openings to accommodate the threads of the casings 8 of the heating element, the heating element embodying an inner casing 9, in which a suitable resistance coil is held, the resistance coil receiving electric energy, through the wires 10 that connect with a suitable source of electricity supply such as the battery of an internal combustion engine. An opening indicated by the reference character 11 is formed in the casing 8 of each heating member, so that water may circulate therethrough and be heated by the contact with the casing 9.

Figure 2:
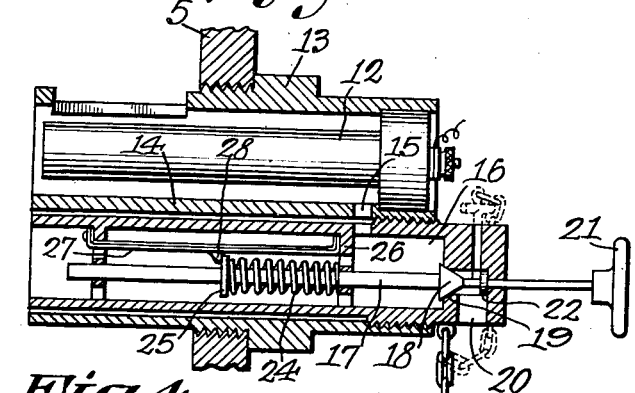
Figure 2 is a longitudinal sectional view through the device.
Figure 4:
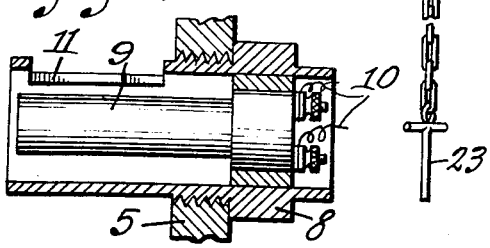
Figure 4 is a sectional view through one of the heating devices employed in maintaining the cooling liquid at a predetermined temperature.
Figure 3:
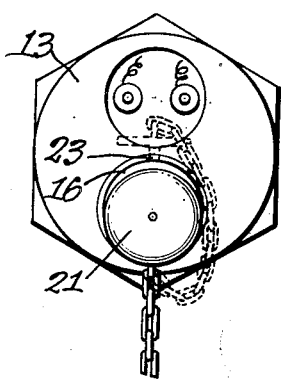
Figure 3 is an end elevational view thereof.

As shown by Figure 2 of the drawing, the casing which houses the heating element 12, is indicated at 13, the casing being divided into compartments, by the wall 14. This wall 14 is formed with an opening indicated at 15, so that the water may circulate through the casing of the heating element.

In the lower compartment of the casing, is the valve member 16 which includes a cylindrical housing formed with bearings in which the valve stem 17 operates, the valve stem 17 carrying the valve 18 at one end thereof, which valve seats against the tapered valve seat 19 formed at the inner end of the discharge opening 20. The stem 17 extends through an opening in one end of the valve housing, and is provided with a knob 21 by means of which the valve stem may be pulled outwardly to seat the valve 18, when it becomes necessary to fill the system with cooling liquid. A collar indicated at 22 is formed on the valve stem, and provides a stop against which the pin 23 may be positioned, to hold the valve in its closed position to fill the system.

The reference character 24 designates a coiled spring positioned on the valve stem 17, one end of the spring resting against the collar 25, the opposite end of the spring resting against the partition 26 formed within the casing of the valve. This spring is normally under tension, to urge the valve 18 from its seat.

Positioned within the valve housing, is a latch member indicated generally by the reference character 27, the latch member comprising a bar of a bimetallic construction, to the end that the bar will be sensitive to heat and cold with the result that when the temperature of the cooling liquid which surrounds the bar 27, reaches a predetermined degree of low temperature which would freeze and burst the jackets, the bar will move away from the valve stem 17. Mounted on the bar is a lug 28 which normally engages the collar 25, restricting movement of the valve stem 17, under the action of the spring 24. It is obvious that as the bar 27 moves due to cold, the lug 28 will be moved to disengage the collar 25, whereupon the coiled spring 24 will move the valve stem 17 to the left, unseating the valve 18, and allowing the cooling liquid to drain from the system, through the opening 20.

In order to refill the system, it is necessary to pull the valve stem 17 to close the valve 18. The pin 23 is now positioned as shown by Figure 2, and the valve is held closed until the temperature of the cooling liquid becomes sufficiently hot to move the bar 27 to the position as shown by Figure 2, holding the valve closed.

A thermostat indicated by the reference character 29 is provided in the circuit with the heating elements 8, so that the current to the heating elements will be controlled to maintain the temperature of the cooling liquid at a predetermined degree.

It might be further stated that the latch member is provided as a precautionary element to release the cooling liquid of the system if for some reason the heating element 9 used in the cooling system for maintaining the liquid temperature at a predetermined degree, should become inoperative to maintain the cooling liquid at a temperature above the freezing point. This condition could arise from the battery supplying electric energy to the heating element becoming dead or one of the wires of the circuit leading from the battery to the heating element, becoming disconnected.

While we have shown and described a number of heating elements as positioned in the water jacket of an internal combustion engine, it is to be understood that the number of heating elements and emergency valves, may be used to meet various requirements, without departing from the spirit of the invention, and although the device is shown on an internal combustion engine, the device may be effectively used in connection with heating systems wherein a liquid is used as the heating element, as is common in building structure.

We claim:

1. In a device of the character described, a hollow body portion adapted to be positioned in the liquid of a cooling system, said body portion having openings admitting liquid of the cooling system to the interior of the body portion, said body portion having an outlet opening, a valve normally closing the outlet opening, a thermostatically controlled latch member normally holding the valve in its closed position, a spring for urging the valve to its open position, and said thermostatically controlled latch member adapted to release the valve to the action of the spring opening the valve and releasing the cooling liquid from the system, when the cooling liquid reaches a predetermined temperature.

2. A device for positioning in the liquid of cooling systems, comprising in combination, a heating element for maintaining the liquid at a predetermined temperature, a release valve supported adjacent to the heating element and adapted to receive cooling liquid therefrom, a thermostatically controlled latch member for normally holding the valve closed, said thermostatically controlled latch member being submerged in the cooling liquid, said thermostatically controlled latch member adapted to release the valve, and a coiled spring for moving the valve to its open position releasing the liquid in the system.

3. A device for positioning in the liquid of cooling systems, comprising in combination, a heating element for maintaining the liquid at a predetermined temperature, a casing in which the heating element is supported, a valve casing supported within the first mentioned casing and in communication therewith to receive cooling liquid from the first mentioned casing, a valve in the valve casing, a bimetallic bar supported within the valve casing, a lug on the bimetallic bar, a collar on the valve, said lug engaging the collar normally holding the valve in its closed position, and a coiled spring bearing against the collar normally urging the valve away from its seat, and adapted to unseat the valve when the lug moves to disengage the collar under the action of the bimetallic bar.

4. A device for positioning in the liquid of cooling systems, comprising in combination, a heating element adapted to maintain the liquid in the cooling system at a predetermined temperature, said heating element including a casing, a valve casing supported by the casing of the heating element, said casings having communicating openings whereby the cooling liquid may circulate therethrough, a release valve for releasing the liquid of the cooling system from the cooling system, said valve including a valve stem, a coiled spring mounted on the valve stem and normally urging the valve away from its seat, a bimetallic bar supported within the valve casing, a collar on the valve stem, means on the bimetallic bar for engaging the collar normally holding the valve to its seat, and said bimetallic bar adapted to move to release the valve to the action of the coiled spring, moving the valve to its open position and releasing the cooling liquid of the system.

HERBERT VAN KEUREN.
ARCHIBALD C. WILKINS.